(12) United States Patent
Min et al.

(10) Patent No.: US 9,715,810 B2
(45) Date of Patent: Jul. 25, 2017

(54) LOGISTICS MONITORING SYSTEM AND METHOD OF OPERATING THE SAME

(71) Applicant: SAMSUNG ELECTRONICS CO., LTD., Suwon-si (KR)

(72) Inventors: Yeongbin Min, Seoul (KR); Kwangyoung Im, Suwon-si (KR); Jonghwa Choi, Suwon-si (KR); Wongeun Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/075,836

(22) Filed: Mar. 21, 2016

(65) Prior Publication Data

US 2017/0015507 A1    Jan. 19, 2017

(30) Foreign Application Priority Data

Jul. 16, 2015    (KR) .......................... 10-2015-0101111

(51) Int. Cl.
| | |
|---|---|
| G08B 21/00 | (2006.01) |
| G08B 21/18 | (2006.01) |
| G06Q 10/00 | (2012.01) |
| B66F 9/14 | (2006.01) |
| G06Q 10/08 | (2012.01) |
| G06Q 50/28 | (2012.01) |

(52) U.S. Cl.
CPC .............. *G08B 21/18* (2013.01); *B66F 9/141* (2013.01); *G06Q 10/00* (2013.01); *G06Q 10/0833* (2013.01); *G06Q 50/28* (2013.01)

(58) Field of Classification Search
CPC ................................ B65G 43/08; G08B 21/18
See application file for complete search history.

(56) References Cited

U.S. PATENT DOCUMENTS

| | | | |
|---|---|---|---|
| 4,821,192 A * | 4/1989 | Taivalkoski | ........... B25J 9/0003 700/258 |
| 6,908,066 B2 | 6/2005 | Koenig | |
| 6,993,405 B2 | 1/2006 | Beaulieu et al. | |
| 7,039,499 B1 | 5/2006 | Nasr et al. | |

(Continued)

FOREIGN PATENT DOCUMENTS

| | | |
|---|---|---|
| JP | 2009-135255 A | 6/2009 |
| KR | 10-2005-0015786 A | 2/2005 |

*Primary Examiner* — Erin File
(74) *Attorney, Agent, or Firm* — Sughrue Mion, PLLC

(57) ABSTRACT

A logistics monitoring system includes: a conveying device configured to transport a product along a conveyance path including a plurality of nodes, generate node-based position information based on a node visited by the conveying device from among the plurality of nodes, and generate driving information related to driving of the conveying device; a monitoring device configured to monitor a state of the conveying device and generate a state parameter based on a result of monitoring; and a diagnostic device configured to determine a position of the conveying device based on map data and at least one of the node-based position information and the driving information, the map data including node information of each of the plurality of nodes and link information of each of a plurality of links, the plurality of links respectively connecting at least two of the plurality of nodes.

17 Claims, 25 Drawing Sheets

(56) References Cited

U.S. PATENT DOCUMENTS

| | | | |
|---|---|---|---|
| 7,274,971 B2 * | 9/2007 | Brill | G05B 19/4189 198/810.01 |
| 7,353,076 B2 | 4/2008 | Nagayasu et al. | |
| 7,496,425 B2 | 2/2009 | Anderson et al. | |
| 8,649,900 B2 | 2/2014 | Jung | |
| 8,751,045 B2 | 6/2014 | Wang et al. | |
| 2007/0271003 A1 * | 11/2007 | Bang | G05D 1/0272 700/245 |
| 2008/0281456 A1 * | 11/2008 | Chen | G05B 19/4189 700/113 |
| 2010/0023151 A1 * | 1/2010 | Shieh | G05B 19/41885 700/105 |
| 2010/0063625 A1 | 3/2010 | Krause et al. | |
| 2010/0127133 A1 | 5/2010 | Schrevere et al. | |
| 2012/0191272 A1 * | 7/2012 | Andersen | G06Q 10/087 701/2 |
| 2012/0321423 A1 * | 12/2012 | MacKnight | H01L 21/67736 414/664 |
| 2014/0277691 A1 * | 9/2014 | Jacobus | G06Q 10/087 700/216 |

* cited by examiner

| NODE ID | HORIZONTAL AND VERTICAL POSITION COORDINATES | NODE ATTRIBUTE |
|---|---|---|
| N1 | (0, 0) | JOINING |
| N2 | (−20, 0) | NORMAL |
| N3 | (−20, 10) | NORMAL |
| ⋮ | ⋮ | ⋮ |
| N6 | (20, 0) | DIVERGENCE |
| ⋮ | ⋮ | ⋮ |

| LINK ID | START NODE ID | LINK ID | END ID | LINK ATTRIBUTE | CURVE ANGLE |
|---------|---------------|---------|--------|----------------|-------------|
| L1 | N1 | N2 | N3 | STRAIGHT LINE | 0° |
| L2 | N2 | N3 | N5 | CURVE | x° |
| L3 | N3 | N10 | N10 | STRAIGHT LINE | 0° |
| ⋮ | ⋮ | ⋮ | ⋮ | ⋮ | ⋮ |

FIG. 14A

| NODE ID | NUMBER OF VISITS |
|---|---|
| N1 | 6 |
| N2 | 7 |
| N3 | 7 |
| N4 | 5 |
| N5 | 3 |
| N6 | 3 |
| N7 | 5 |
| N8 | 4 |
| N9 | 2 |
| N10 | 6 |
| N11 | 7 |
| N12 | 8 |
| N13 | 3 |
| N14 | 6 |
| N15 | 6 |
| N16 | 2 |
| N17 | 6 |
| N18 | 8 |
| N19 | 6 |
| ⋮ | ⋮ |

*REFERENCE VALUE OF NUMBER OF VISITS : 5

LOGISTICS MONITORING SYSTEM AND METHOD OF OPERATING THE SAME

CROSS-REFERENCE TO RELATED APPLICATION

This application claims priority from Korean Patent Application No. 10-2015-0101111, filed on Jul. 16, 2015, in the Korean Intellectual Property Office, the disclosure of which is incorporated herein in its entirety by reference.

BACKGROUND

Systems and methods consistent with exemplary embodiments relate to a logistics monitoring system and a method of operating the logistics monitoring system, and more particularly, to a logistics monitoring system for monitoring a state of a conveying device and a method of operating the logistics monitoring system.

While semiconductor integrated circuits (ICs) are manufactured, a plurality of processes are performed on semiconductor wafers via a plurality of processing apparatuses. For example, in order to manufacture IC chips, a deposition process, an ion implantation process, an etching process, and a passivation process may be performed via different processing apparatuses. In order to transport semiconductor wafers between processing apparatuses, a logistics monitoring system such as an automated material handling system (AMHS) may be used. Since semiconductor wafers are sensitive to the external environment, monitoring the external environment when transporting products, such as semiconductor wafers, between processing apparatuses is desirable.

SUMMARY

One or more exemplary embodiments provide a logistics monitoring system that may accurately and rapidly determine a state of a conveying device according to a position of the conveying device and allow a user to effectively cope with an abnormal state of the conveying device and an abnormal state of a surrounding environment.

One or more exemplary embodiments also provide a method of operating the logistics monitoring system.

According to an aspect of an exemplary embodiment, there is provided a conveying device configured to transport a product along a conveyance path including a plurality of nodes, generate node-based position information based on a node visited by the conveying device from among the plurality of nodes, and generate driving information related to driving of the conveying device; a monitoring device configured to monitor a state of the conveying device and generate a state parameter based on a result of monitoring; and a diagnostic device configured to determine a position of the conveying device based on map data and at least one of the node-based position information and the driving information, the map data including node information of each of the plurality of nodes and link information of each of a plurality of links, the plurality of links respectively connecting at least two of the plurality of nodes.

The diagnostic device may determine the position of the conveying device based on the map data and the driving information, and the diagnostic device may identify the node visited by the conveying device, determine a position of the visited node based on the map data, and determine the position of the conveying device by calculating a distance by which the conveying device has moved from the position of the visited node based on the driving information.

The conveying device may include a driver that moves the conveying device along the conveyance path, and the driving information may include a number of rotations of the driver in a predetermined period of time.

The diagnostic device may include a diagnostic device controller that matches the determined position of the conveying device to a state parameter that is generated by the monitoring device based on the state of the conveying device at the determined position.

The diagnostic device may include a display device that displays the determined position of the conveying device and the state parameter matched to the determined position of the conveying device.

The diagnostic device may include a map data storage unit configured to store the map data of the conveyance path.

The node information may include at least one of a node identification (ID) of a node, horizontal position coordinates corresponding to the node, vertical position coordinates corresponding to the node, and an attribute corresponding to the node, and the link information may include at least one of a link ID of a link, a start node ID indicating a node at which the link starts, an end node ID indicating a node at which the link ends, and an attribute corresponding to the link.

The monitoring device may include a sensor that generates the state parameter, the state parameter including at least one of a driving parameter indicating a driving state of the conveying device and an environmental parameter indicating a state of a surrounding environment of the conveying device.

The driving parameter may include a parameter of at least one of a velocity, an acceleration, an equilibrium, an angular velocity, and a vibration of the conveying device, and the environmental parameter may include a parameter of at least one of a temperature, a humidity, an atmospheric pressure, a geomagnetic, a radioactivity, a noise, a fine dust, and a gas of the surrounding environment of the conveying device.

The conveying device may include a plurality of conveying devices and the logistics monitoring system may further include a conveyance control device that controls movement of the plurality of conveying devices. The conveyance control device may determine a test route based on the node-based position information, and perform a test operation by moving at least one of the plurality of conveying devices along the test route.

The diagnostic device may generate information about a number of visits to the plurality of nodes by the plurality of conveying devices based on the node-based position information, and the conveyance control device may identify a test node for which the number of visits by the plurality of conveying devices is less than a reference value, from among the plurality of nodes, based on the information about the number of visits, and determine the test route based on the test node.

The conveyance control device may determine whether to perform the test operation, based on a ratio of the number of the plurality of conveying devices to a conveyance workload of the plurality of conveying devices.

According to an aspect of another exemplary embodiment, there is a method of operating a logistics monitoring system, the method including: transporting a product along a conveyance path including a plurality of nodes by using a plurality of conveying devices; identifying nodes visited by the plurality of conveying devices and generating node-based position information of the plurality of conveying devices based on a result of the identifying; generating driving information related to driving of the plurality of conveying devices; generating a state parameter, which indicates a state of each of the plurality of conveying devices, by using monitoring devices respectively attached to the plurality of conveying devices; and determining positions of the plurality of conveying devices based on map data of the conveyance path and at least one of the node-based position information and the driving information, the map data including node information of each of the plurality of nodes and link information of each of a plurality of links, the plurality of links respectively connecting at least two of the plurality of nodes.

The method may further include matching a position of each of the plurality of conveying devices to a state parameter that is generated based on the state of each of the plurality of conveying devices at the position.

The method may further include generating information about a number of visits to the plurality of nodes by the plurality of conveying devices based on the node-based position information; identifying a test node for which the number of visits by the plurality of conveying devices is less than a reference value, from among the plurality of nodes, based on the information about the number of visits; and determining a test route based on the test node and performing a test operation by moving at least one of the plurality of conveying devices along the test route.

According to an aspect of still another exemplary embodiment, there is a logistics monitoring system including: a conveying device configured to move along a conveyance path including a plurality of nodes and transmit node-based position information based on a node visited by the conveying device; a monitoring device configured to monitor a state of the conveying device and generate a state parameter based on a result of monitoring; and a diagnostic device configured to determine a position of the conveying device based on map data and the node-based position information, the map data including node information of each of the plurality of nodes and link information of each of a plurality of links, the plurality of links respectively connecting at least two of the plurality of nodes, wherein the diagnostic device controls the conveying device based on at least one of the position of the conveying device and the state parameter.

The conveying device may generate driving information related to driving of the conveying device, and the diagnostic device may determine the position of the conveying device further based on the driving information, by calculating a distance by which the conveying device has moved from a position of the visited node based on the driving information.

The diagnostic device may include a diagnostic device controller that matches the determined position of the conveying device to a state parameter that is generated by the monitoring device based on the state of the conveying device at the determined position.

The diagnostic device controller may determine a certain position of the conveying device having an abnormal state in response to determining that the state parameter that matches the certain position of the conveying device is not within a reference range, and the conveyance path is adjusted based on the certain position of the conveying device having the abnormal state.

The conveyance control device may determine a test route based on the node-based position information, and performs a test operation by moving the conveying device along the test route.

BRIEF DESCRIPTION OF THE DRAWINGS

The above and/or other aspects will be more apparent by describing certain example embodiments with reference to the accompanying drawings, in which:

FIG. 9A is a diagram showing node information included in map data, and FIG. 9B is a diagram showing link information included in the map data;

FIGS. 14A, 14B, and 14C are diagrams for explaining a method of setting a test route, according to an exemplary embodiment;

FIGS. 15A and 15B are diagrams for explaining a method of setting a test route, according to another exemplary embodiment.

DETAILED DESCRIPTION

Figure 1:
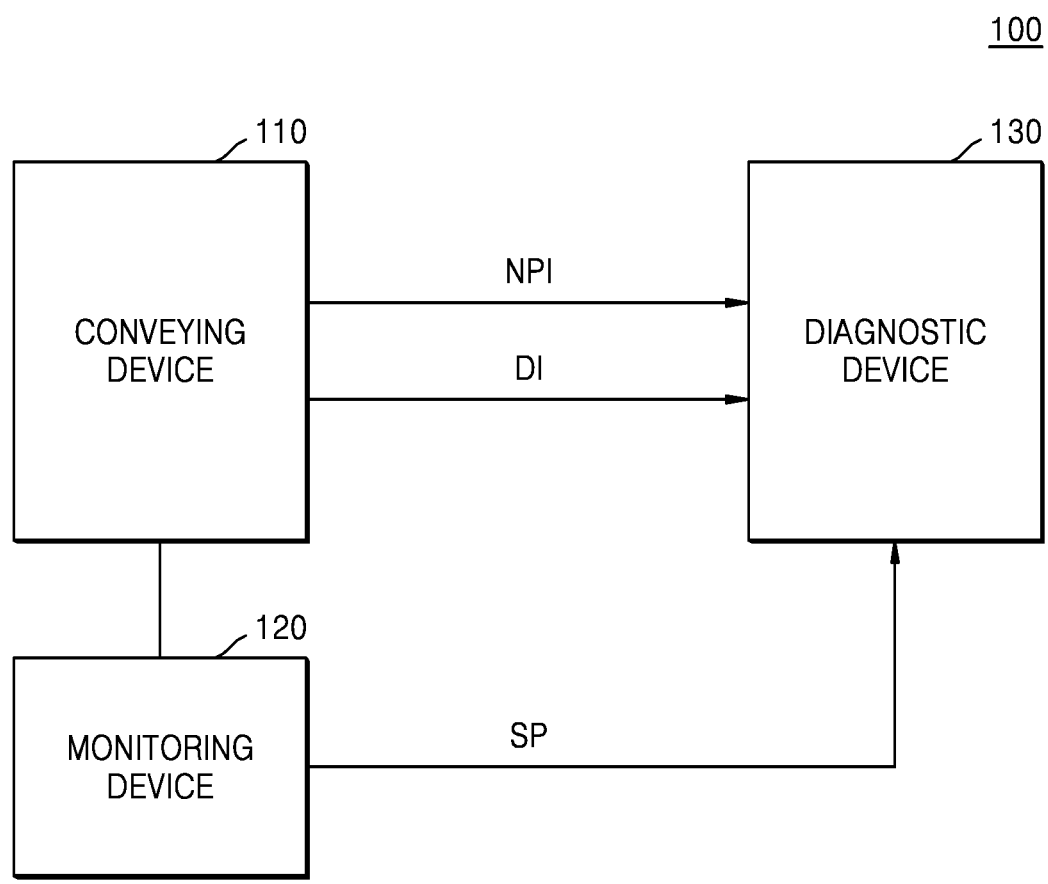
FIG. 1 is a block diagram of a logistics monitoring system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail. Like reference numerals refer to like elements throughout. In the drawings, the thicknesses of layers and regions may be exaggerated for clarity.

The terminology used herein is for the purpose of describing particular embodiments only and is not intended to be limiting of the inventive concept. As used herein, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless explicitly so defined herein. As used herein, the term "and/or" includes any and all combinations of one or more of the associated listed items.

FIG. 1 is a block diagram of a logistics monitoring system 100 according to an exemplary embodiment.

Referring to FIG. 1, the logistics monitoring system 100 may include a conveying device 110, a monitoring device 120, and a diagnostic device 130. The conveying device 110 may convey products along a conveyance path to suitable semiconductor equipment according to a semiconductor process sequence. The products may correspond to an airtight container that accommodates wafers. For example, the airtight container may be a front open unified pod (FOUP). As an exemplary embodiment, the conveying device 110 may be a conveyance vehicle, and may be buffer equipment, such as a stocker, a side track buffer (STB), and a under track buffer (UTB) which will be described later. The conveyance path may include a plurality of nodes. The conveying device 110 may generate node-based position information NPI to determine the position of the conveying device 110 when conveying products along the conveyance path. As an exemplary embodiment, the node-based position information NPI may be information indicating, in real time, a node which the conveying device 110 passes. The conveying device 110 may generate driving information DI while conveying products along the conveyance path. As an exemplary embodiment, the driving information DI may include information about products conveyed by the conveyance 110, and basic information from which a movement distance of the conveying device 110 may be calculated. This will be described in detail later.

The monitoring device 120 is detachable from the conveying device 110, and may include, for example, at least one sensor unit and generate a state parameter SP to monitor a state of the conveying device 110. As an exemplary embodiment, the state of the conveying device 110 may include, for example, at least one from among a state of a surrounding environment of the conveying device 110 and a driving state of the conveying device 110. The state parameter SP may include, for example, at least one of a driving parameter indicating a driving state of the conveying device 110 and an environmental parameter indicating a state of a surrounding environment of the conveying device 110. The driving parameter may include, for example, at least one of a velocity parameter, an acceleration parameter, an equilibrium parameter, an angular velocity parameter, and a vibration parameter, which numerically indicate velocity, acceleration, equilibrium, angular velocity, and vibration of the conveying device 110, respectively. The environmental parameter may include, for example, at least one of a temperature parameter, a humidity parameter, an atmospheric pressure parameter, a geomagnetic parameter, a radioactivity parameter, a noise parameter, a fine dust parameter, and a gas parameter, which numerically indicate temperature, humidity, atmospheric pressure, geomagnetism, radioactivity, noise, fine dust, and gas around the conveying device 110, respectively.

The diagnostic device 130 may receive the node-based position information NPI and the driving information DI from the conveying device 110, and may receive the state parameter SP from the monitoring device 120. The conveying device 110, the monitoring device 120, and the diagnostic device 130 may perform wired and/or wireless communication with each other. As an exemplary embodiment, signals may be transmitted via wired communication. For example, signals such as the node-based position information NPI, the driving information DI, and the state parameter SP may be transmitted by using an interface such as a universal serial bus (USB). Signals may be transmitted by using a communication method, such as wireless fidelity (Wi-Fi), Bluetooth (BT), or near field communication (NFC). In this case, the conveying device 110, the monitoring device 120, and the diagnostic device 130 may include wired and/or wireless communication modules to perform the wired and/or wireless communication.

The diagnostic device 130 may include a data storage unit that stores map data of a conveyance path. The diagnostic device 130 may determine the position of the conveying device 110 based on the map data and at least one of the node-based position information NPI and the driving information DI. In other words, the diagnostic device 130 may determine the position of the conveying device 110 and match a state parameter SP generated by the monitoring device 120 attached to the conveying device 110 to the determined position. For example, if it is determined that the conveying device 110 is in a first position, the diagnostic device 130 may match a first state parameter generated by the monitoring device 120 to the first position. Through this operation, it is possible to determine a state of a surrounding environment at each position of the conveyance path and a driving state of the conveying device 110.

According to the logistics monitoring system 100 according to the exemplary embodiment, the position of the conveying device 110 may be determined based on the map data and at least one of the node-based position information NPI and the driving information DI, and thus, when an abnormal state occurs at a position other than nodes on a conveyance path, the position in which an abnormal state has occurred may be effectively determined.

Figure 2:
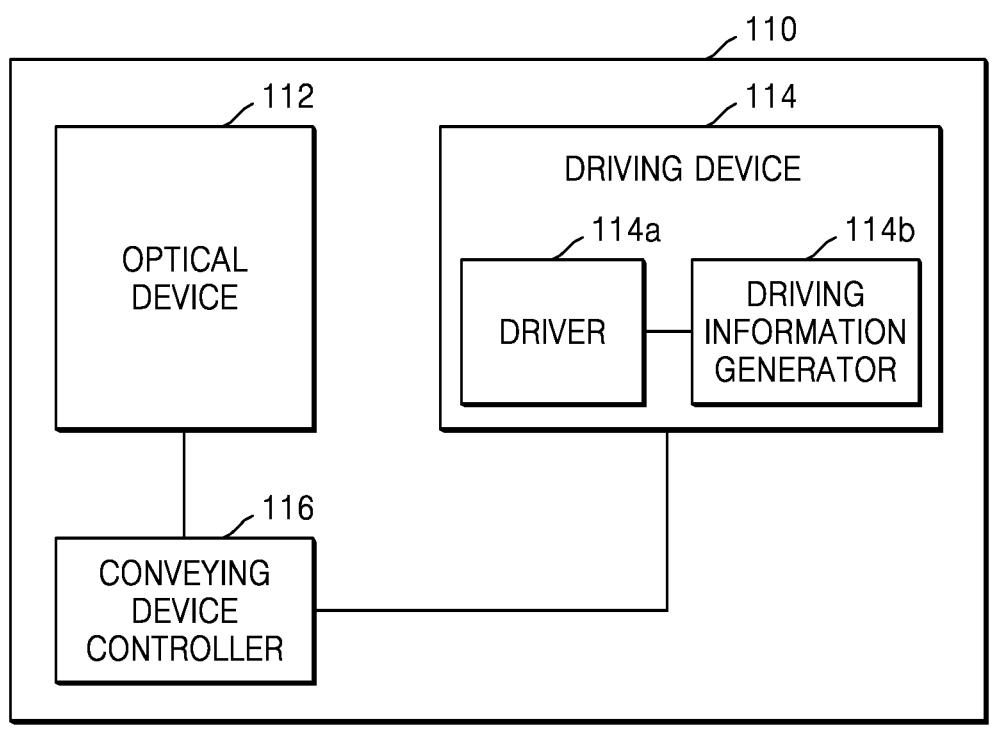
FIG. 2 is a block diagram of a conveying device according to an exemplary embodiment.

FIG. 2 is a block diagram of the conveying device 110 of FIG. 1, according to an exemplary embodiment.

The conveying device 110 may include an optical device 112, a driving device 114, and a conveying device controller 116. The conveying device 110 may recognize a position tag, attached to each of a plurality of nodes of a conveyance path, by using the optical device 112. As an exemplary embodiment, the position tag may be represented by a barcode, a text, an image, or a combination thereof. The optical device 112 may detect a visit node visited by the conveying device 110 by recognizing the position tag and generate node-based position information NPI. The optical device 112 may recognize the position tag in response to infrared rays, visible rays, ultraviolet rays, or a combination thereof.

The driving device 114 may include a driver 114A that enables the conveying device 110 to move along a conveyance path, and a driving information generator 114B that generates driving information. The driving information may be information that is related to driving of the conveying device 110. For example, the driver 114A may include a wheel device and a motor device that drives the wheel device. As an exemplary embodiment, the driving information generator 114B may generate driving information including the number of rotations of the driver 114A by periodically counting the number of rotations of the driver 114A. To count the number of rotations of the driver 114A, the driving information generator 114B may count the number of rotations of the wheel device of the driver 114A or calculate the number of rotations of the wheel device of the driver 114A based on revolution per minute (RPM) information of the motor device of the driver 114A. For example, if the driving information generator 114B counts the number of rotations of the driver 114A during a period of ten seconds, the driving information generator 114B may generate driving information including the number of rotations of the driver 114A, counted for initial ten seconds, and then may generate driving information including the number of rotations of the driver 114A, counted for next ten seconds. However, this case is only an example, and the period during which the driving information generator 114B counts the number of rotations of the driver 114A may be adjusted. The driving information may include driver specification information, such as a diameter or circumference of the driver A and a movement distance per one revolution of the driver 114A. However, the driver specification information may be stored in the diagnostic device 130 of FIG. 1 in advance, and thus may not be included in the driving information.

The conveying device controller 116 may control the optical device 112 to generate the node-based position information NPI. The conveying device controller 116 may control the driving device 114 to control an operation of conveying products along a conveyance path. Also, the conveying device controller 116 may control the driving device 114 to generate the driving information. As an exemplary embodiment, the conveying device controller 116 may control the driving device 114 so that the driving device 114 may generate the driving information, immediately after visiting a specific node of a plurality of nodes included in the conveyance path.

Figure 3:
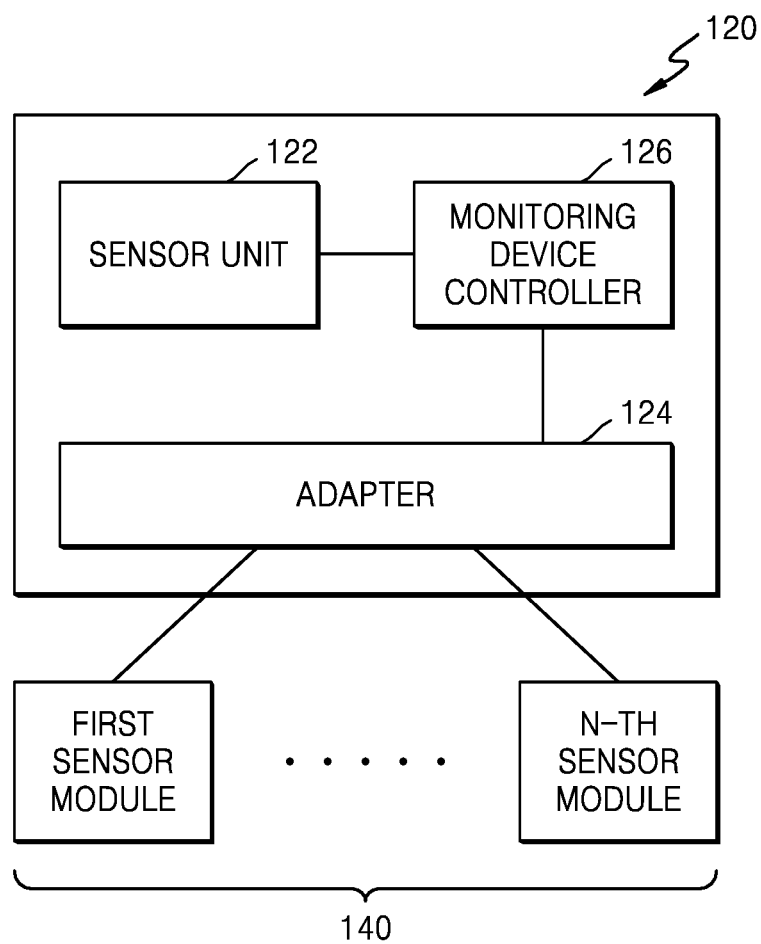
FIG. 3 is a block diagram of a monitoring device according to an exemplary embodiment.

FIG. 3 is a block diagram of the monitoring device 120, according to an exemplary embodiment.

Referring to FIG. 3, the monitoring device 120 may include a sensor unit 122, an adapter 124, and a monitoring device controller 126. The sensor unit 122 may include at least one sensor implemented in the monitoring device 120. The sensor unit 122 may include at least one driving sensor that may measure a driving parameter of the driver 110 of FIG. 1, and at least one environmental sensor that may measure an environmental parameter of the driver 110. The driving sensor may be one of a velocity sensor, an acceleration sensor, an equilibrium sensor, an angular velocity sensor, and a vibration sensor. The environmental sensor may be one of a temperature sensor, a humidity sensor, an atmospheric pressure sensor, a geomagnetic sensor, a radioactivity sensor, a noise sensor, a fine dust sensor, and a gas sensor. Also, the sensor unit 122 may include a camera that may generate images.

The monitoring device 120 may perform wired and/or wireless communication with a plurality of sensor modules 140 located outside the monitoring device 120, via an interface that is provided by the adapter 124. As an exemplary embodiment, in the wired communication, the adapter 124 may receive a state parameter, generated by the plurality of sensor modules 140, by using an interface such as an USB. As another exemplary embodiment, in the wireless communication, the adapter 124 may receive a state parameter, generated by the plurality of sensor modules 140, by using a communication method, such as Wi-Fi, BT, or NFC. In this case, the adapter 124 and the plurality of sensor modules 140 each may include wired and/or wireless communication module to perform the wired and/or wireless communication.

The monitoring device controller 126 may control an operation in which the sensor unit 122 generates a state parameter. The monitoring device controller 126 may control an operation in which the plurality of sensor modules 140 generate a state parameter, via the adapter 124. The monitoring device controller 126 may receive state parameters from the sensor unit 122 or the plurality of sensor modules 140, and may sort the state parameters according to times at which the state parameters have been received and store the sorted state parameters. The monitoring device controller 126 may further include a storage unit to store the sorted state parameters.

Figure 4A:
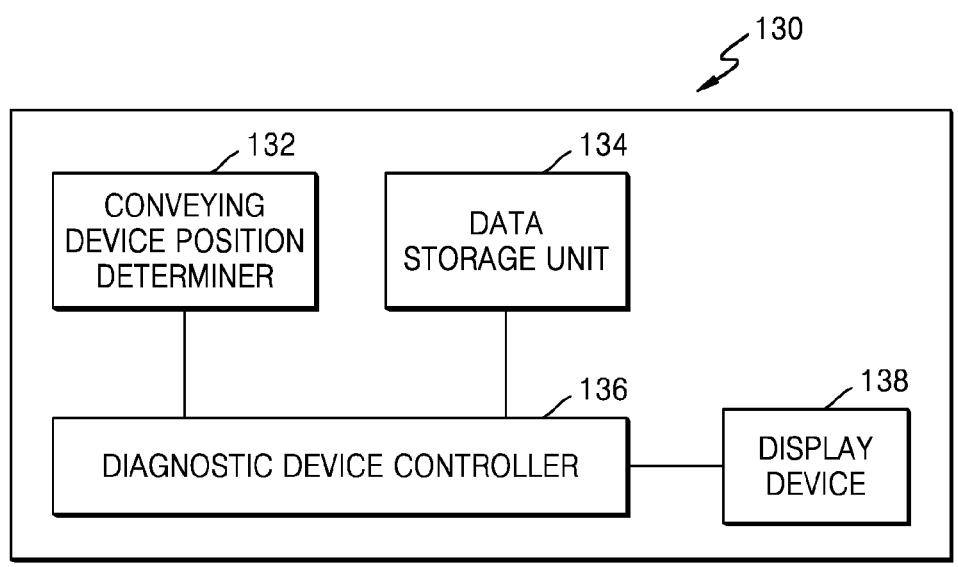
FIG. 4A is a block diagram of a diagnostic device according to an exemplary embodiment.
Figure 4B:
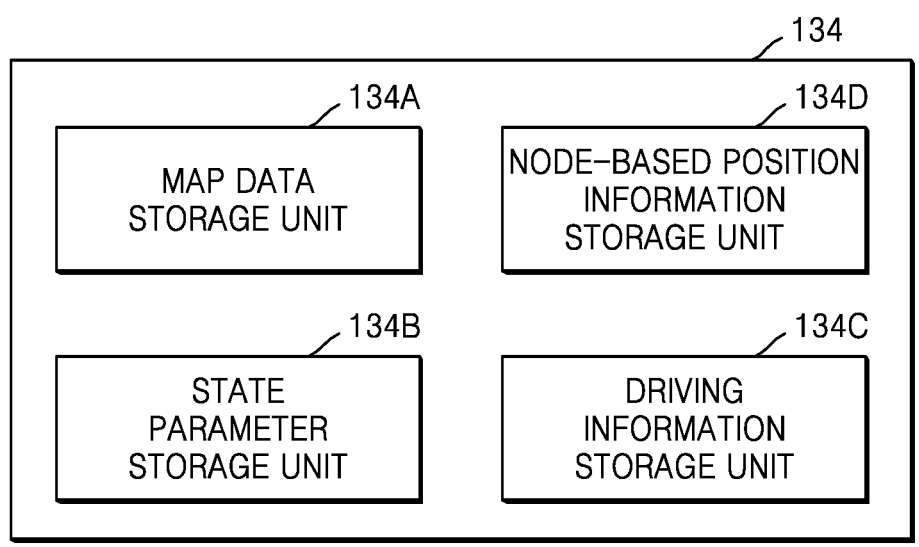
FIG. 4B is a block diagram of a data storage unit according to an exemplary embodiment.

FIG. 4A is a block diagram of the diagnostic device 130 of FIG. 1, according to an exemplary embodiment, and FIG. 4B is a block diagram of a data storage unit 134 of FIG. 4A, according to an exemplary embodiment.

Referring to FIGS. 1 and 4A, the diagnostic device 130 may include a conveying device position determiner 132, a data storage unit 134, a diagnostic device controller 136, and a display device 138. The conveying device position determiner 132 may receive node-based position information NPI and driving information DI from the conveying device 110 of FIG. 1. The conveying device position determiner 132 may determine the position of the conveying device 110 by determining a visit node, visited by the conveying device 110, with reference to the node-based position information NPI. Also, the conveying device position determiner 132 may determine a visit node, visited by the conveying device 110, with reference to the node-based position information NPI and determine the position of the visit node with reference to map data of a conveyance path. The conveying device position determiner 132 may calculate a distance by which the conveying device 110 has moved from the position of the visit node, based on the driving information DI and determine the position of the conveying device 110.

The data storage unit 134 may store data including the map data of the conveyance path, the node-based position information NPI and the driving information DI received from the conveying device 110, the state parameter SP received from the monitoring device 120, and a threshold value that is compared with the state parameter SP. The data storage unit 134 may sort the data according to times at which the data have been received and store the sorted data.

The diagnostic device controller 136 may control an operation in which the conveying device position determiner 132 determines the position of the conveying device 110, and may control an operation in which the data storage unit 124 stores received data. Also, the diagnostic device controller 136 may match the position of the conveying device 110, determined by the conveying device position determiner 132, to a state parameter generated at the determined position of the conveying device 110 from among received state parameters SP. For example, when the conveying device 110 is determined as being located at a first position by the conveying device position determiner 132, the diagnostic device controller 136 may match a first state parameter generated at the first position to the first position.

To perform a matching operation, the diagnostic device controller 136 may refer to data stored in the data storage unit 134 that are sorted according to times at which the data have been received. Specifically, a-th node-based position information NPI_a and an a-th state parameter SP_a, received at an a-th time, may be sorted as data received at a corresponding time, i.e., the a-th time, and be stored in the data storage unit 134. By determining a visit node, visited by the conveying device 110, with reference to the a-th node-based position information NPI_a, the conveying device 110 may be determined as being located at an a-th position. In this case, the diagnostic device controller 136 may match the a-th position to the a-th state parameter SP_a. In addition, b-th driving information DI_b and a b-th state parameter SP_b, received at a b-th time, may be sorted as data received at a corresponding time, i.e., the b-th time, and be stored in the data storage unit 134. The visit node visited by the conveying device 110 may be determined with reference to the a-th node-based position information NPI_a that is received and stored before the b-th time, and the position of the visit node may be determined with reference to map data of a conveyance path. The conveying device position determiner 132 may calculate a distance by which the conveying device 110 has moved from the position of the visit node, based on the b-th driving information DI_b and determine the position of the conveying device 110 as a b-th position. In this case, the diagnostic device controller 136 may match the b-th position to the b-th state parameter SP_b. However, the above method is only an example and the exemplary embodiments are not limited thereto, and various methods may be used.

The diagnostic device controller 136 may compare received state parameter with a previously set reference value (i.e., threshold value) corresponding to the received state parameter, and may determine a position of the conveying device 110, which is matched with the received state parameter, as an abnormal state position when the received state parameter exceeds the reference value. As another exemplary embodiment, the diagnostic device controller 136 may determine a position of the conveying device 110, which is matched with the received state parameter, as an abnormal state position when the received state parameter is less than the reference value. In other words, the diagnostic device controller 136 may determine a position of the conveying device 110, which matches the received state parameter, as an abnormal state position when the received state parameter is not within a reference range.

In this case, the diagnostic device controller 136 may generate an image based on the abnormal state position and a state parameter corresponding to the abnormal stat position and output the image, via the display device 138. In addition, the diagnostic device controller 136 may generate an image based on a determined position of the conveying device 110 and a state parameter corresponding to the determined position into an image and output the image, via the display device 138.

Referring to FIG. 4B, the data storage unit 134 may include a map data storage unit 134A, a state parameter storage unit 134B, a driving information storage unit 134C, and a node-based position information storage unit 134D. The map data storage unit 134A may store map data for a conveyance path along which a conveying device passes to transport products. The map data may be set in advance, and new map data may be received from the outside to store the new map data. The state parameter storage unit 134B may sort state parameters according to times at which the state parameters have been received and store the sorted state parameters. The driving information storage unit 134C may also sort driving information according to time and store the sorted driving information, and the node-based position information storage unit 134D may also sort node-based position information according to time and store the sorted node-based position information.

Figure 5A:
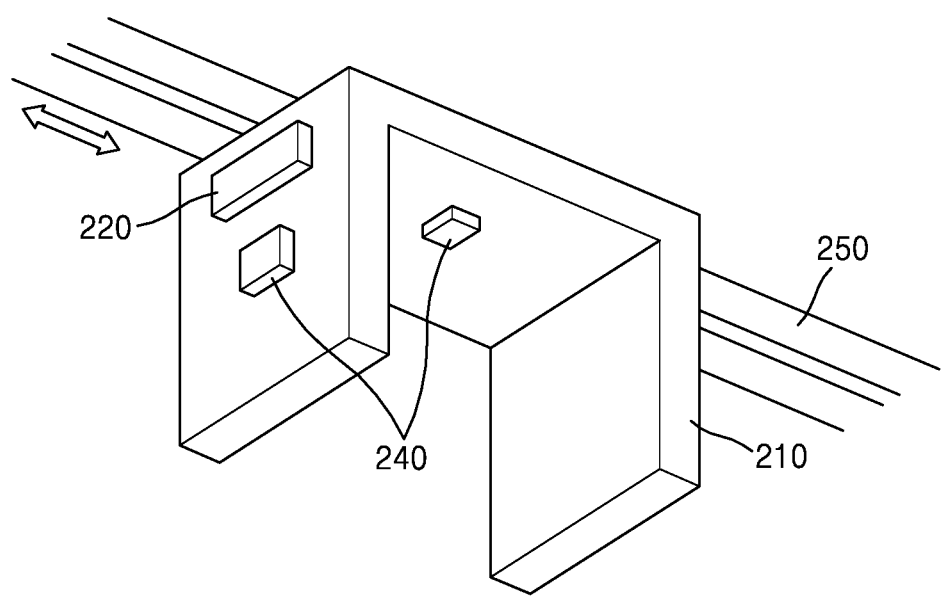
FIG. 5A is a side view of a structure in which a monitoring device is attached to a conveying device, according to an exemplary embodiment.
Figure 5B:
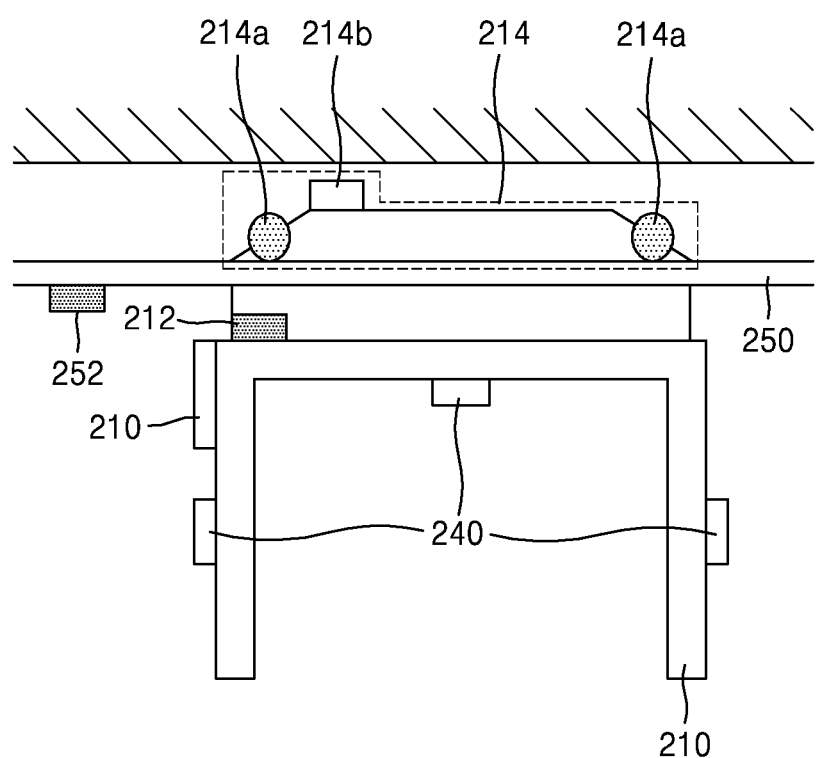
FIG. 5B is a cross-sectional view of the structure in which the monitoring device is attached to the conveyance vehicle, according to an exemplary embodiment.

FIG. 5A is a side view of a structure in which a monitoring device 220 is attached to a conveyance vehicle 210, according to an exemplary embodiment, and FIG. 5B is a cross-sectional view of the structure in which the monitoring device 220 is attached to the conveyance vehicle 210, according to an exemplary embodiment.

Referring to FIG. 5A, the conveyance vehicle 210 corresponding to the conveying device 110 of FIG. 1 may move along a conveyance path 250 while being loaded with products. The monitoring device 220 may be attached to a portion of the conveyance vehicle 210, and may generate a state parameter by monitoring a driving state of the conveyance vehicle 210 and a state of a surrounding environment. The monitoring device 220 is detachable from the conveyance vehicle 210. In addition, a plurality of sensor modules 240 may be attached to a portion of the conveyance vehicle 210, and the monitoring device 220 may receive a state parameter generated by at least one of the plurality of sensor modules 240.

Referring to FIG. 5B, the conveyance vehicle 210 may include an optical device 212 and a driving device 214. The conveyance path 250 may include a node 252. As described above, a position tag may be attached to the node 252, and the optical device 212 may recognize the position tag. Thus, the optical device 212 may generate node-based position information that may indicate that the node 252 is visited by the conveyance vehicle 210 that moves along the conveyance path 250.

The driving device 214 may include a driver 214a and a driving information generator 214b. According to an exemplary embodiment, the driver 214a may be implemented with a wheel device. The driver 214a may revolve along the conveyance path 250 and move the conveyance vehicle 210. The driving information generator 214b may periodically count the number of rotations of the driver 214a and generate driving information including the number of rotations of the driver 214a. The driving information may further include information indicating whether the conveyance vehicle 210 is loaded with products.

The monitoring device 210 may be attached to a position that is selected according to a parameter of the conveyance vehicle 210 that is to be monitored, and thus, a desired state of the conveyance vehicle 210 may be monitored. Also, the monitoring device 210 may include an adapter, and may receive various state parameters by performing wired and/or wireless communication with the plurality of sensor modules 240, attached to the conveying device 210, via the adapter. Thus, an effective monitoring operation may be performed.

Figure 6:
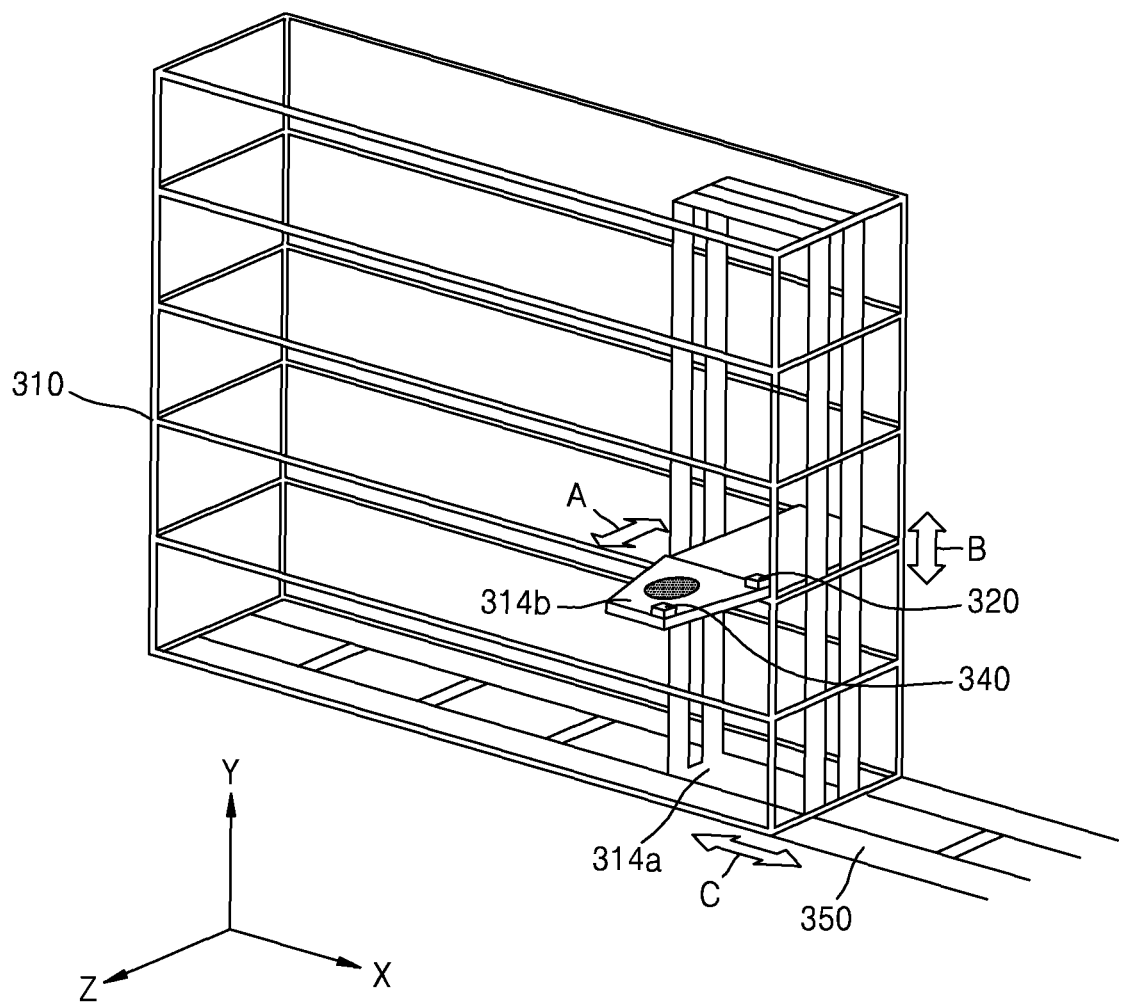
FIG. 6 is a diagram of a structure in which a monitoring device is attached to a stocker which is one of buffer devices for storing products, according to an exemplary embodiment.

FIG. 6 is a diagram of a structure in which a monitoring device 320 is attached to a stocker 310 that is one of buffer devices for keeping products, according to an exemplary embodiment.

Referring to FIG. 6, the stocker 310 may include a crane 314a and a fork 314b to move products to an internal buffer position. In other words, the stocker 310 may correspond to the conveying device 110 of FIG. 2, and the crane 314a and the fork 314b may correspond to the driver 114a of the driving device 114 of FIG. 2. The crane 314a may move based on an x-axis direction along the conveyance path 350. The fork 314b may be loaded with products and move based on a y-axis direction or a z-axis direction. In this case, a monitoring device 320 and a sensor module 340 may be attached to the fork 314b. Furthermore, the monitoring device 320 or the sensor module 340 may also be attached to the crane 314a. Thus, the monitoring device 320 may generate a state parameter by monitoring a driving state of the stocker 310 including the crane 314a and the fork 314b and a state of a surrounding environment.

Figure 7:
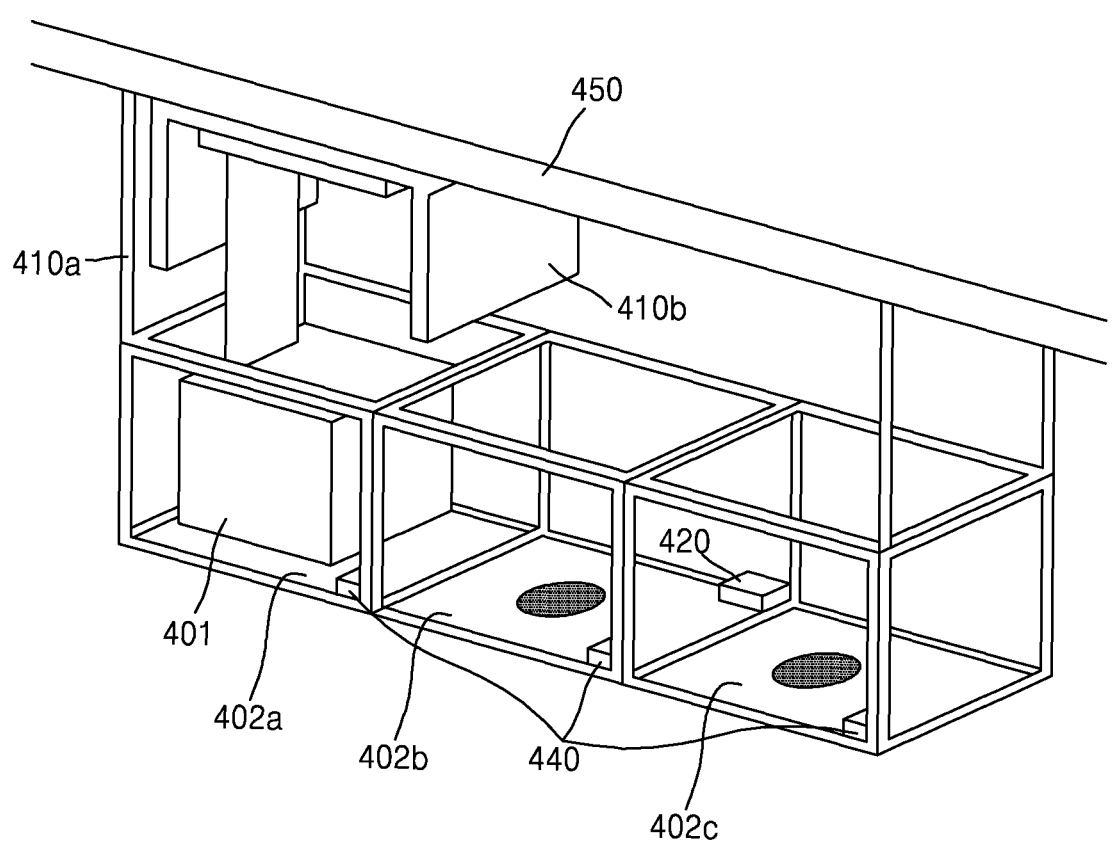
FIG. 7 is a diagram of a structure in which a monitoring device is attached to an under track buffer (UTB), which is another one of buffer devices for storing products, according to an exemplary embodiment.

FIG. 7 is a diagram of a structure in which a monitoring device 420 is attached to a UTB 410a that is another one of buffer devices for keeping products, according to an exemplary embodiment.

Referring to FIG. 7, the UTB 410a may include a plurality of shelves 402a-402c (i.e., first through third shelves 402a-402c) that may keep products 401. A conveyance vehicle 410b corresponds to the conveyance vehicle 210 of FIG. 5A, and may convey the products 401 to the first shelf 402a along a conveyance path 450. The monitoring device 420 may be attached to the UTB 410a. For example, the monitoring device 420 may be attached to the second shelf 402b. In addition, a plurality of sensor modules 440 may be attached to the plurality of shelves 402a-402c, respectively. The monitoring device 420 may monitor, via the plurality of sensor modules 440, a state of the conveyance vehicle 410b while the conveyance vehicle 410b performs an operation of moving the products 401 to the UTB 410a to store the products 401 in the UTB 410a, and generate a state parameter. As an exemplary embodiment, the state parameter may be an environmental parameter indicating the degree of temperature, humidity, atmospheric pressure, geomagnetism, radioactivity, noise, fine dust, or gas around each of the shelves 402a-402c. Also, the state parameter may be a driving parameter indicating, for example, the degree of equilibrium or vibration of the UTB 410a.

Figure 8A:
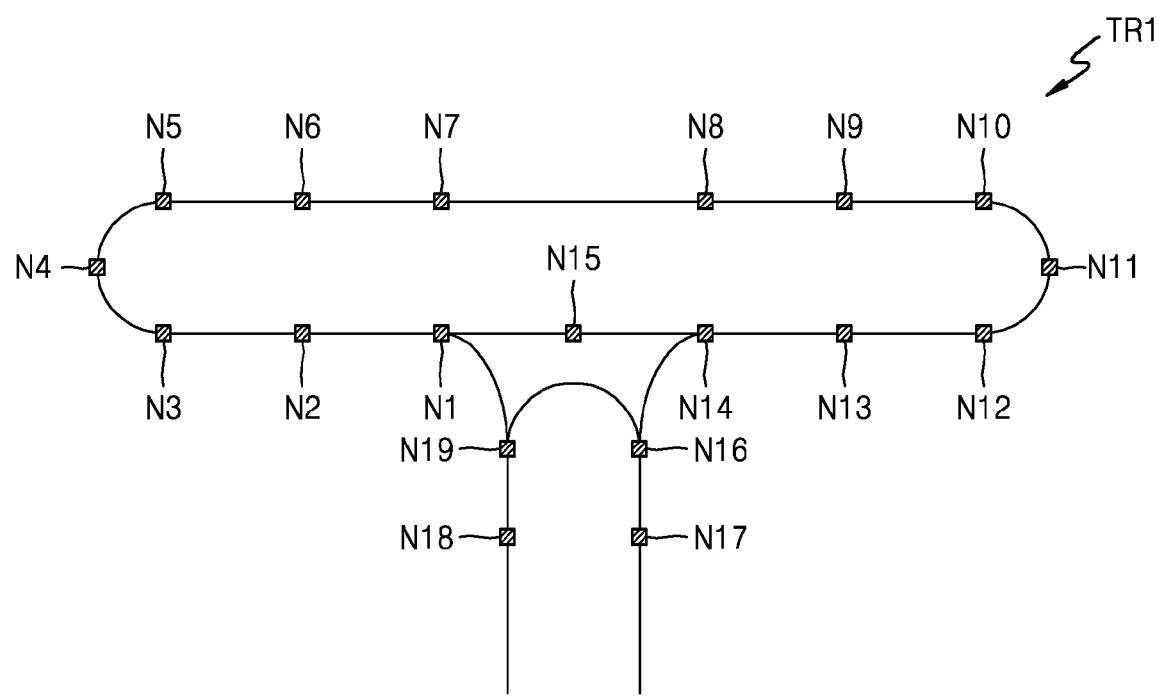
FIG. 8A is a diagram illustrating a first conveyance path according to an exemplary embodiment.
Figure 8B:
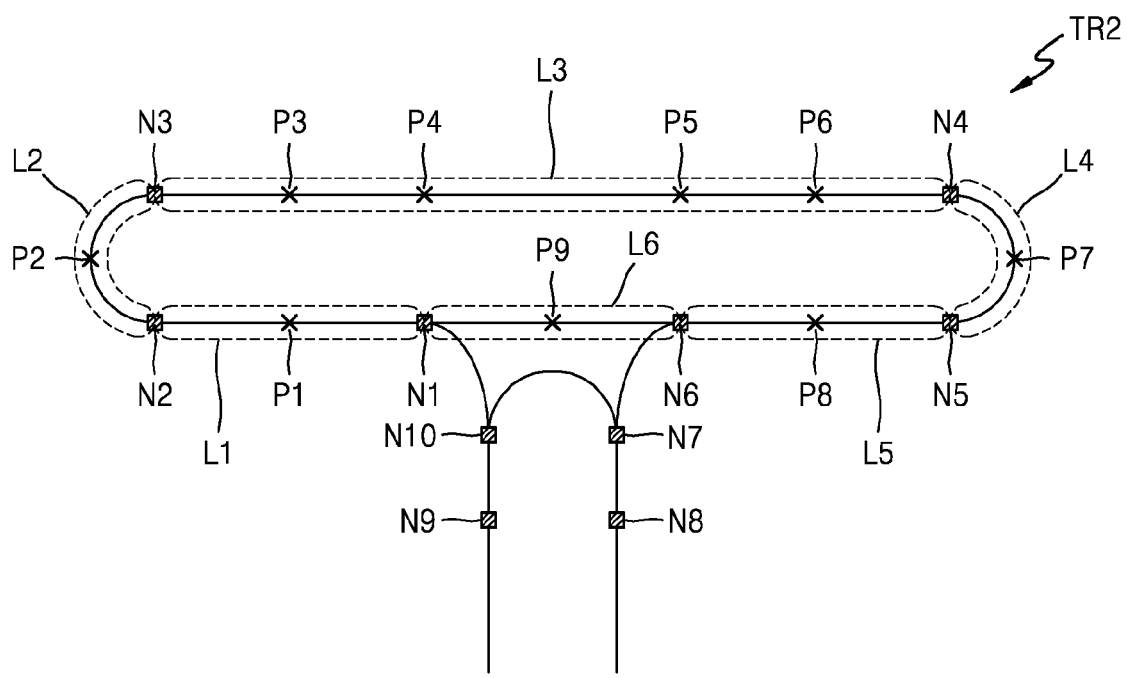
FIG. 8B is a diagram illustrating a second conveyance path according to an exemplary embodiment.

FIG. 8A is a diagram illustrating a first conveyance path TR1 according to an exemplary embodiment, and FIG. 8B is a diagram illustrating a second conveyance path TR2 according to an exemplary embodiment.

Referring to FIG. 8A, the first conveyance path TR1 may include a plurality of nodes N1-N19 (i.e., first through nineteenth nodes N1-N19). The conveying device 110 of FIG. 1 may convey products along the first conveyance path TR1. The conveying device 110 may generate node-based position information NPI each time the conveying device 110 visits one of the plurality of nodes N1-N19. For example, when the conveying device 110 visits the first node N1, the conveying device 110 may generate first node-based position information NPI_1 indicating that the conveying device 110 is positioned at the first node N1. Next, when the conveying device 110 visits the second node N2, the conveying device 110 may generate second node-based position information NPI_2 indicating that the conveying device 110 is positioned at the second node N2.

The diagnostic device 130 of FIG. 1 may determine a visit node that is visited by the conveying device 110 with reference to the node-based position information NPI. For example, when the diagnostic device 130 receives the first node-based position information NPI_1, the diagnostic device 130 may determine that the conveying device 110 is positioned at the first node N1.

In response to visiting of each of the plurality of nodes N1-N19 by the conveying device 110, the monitoring device 120 may generate a state parameter SP by monitoring a state of the conveying device 110 in the position of each of the plurality of nodes N1-N19. For example, when the conveying device 110 visits the first node N1, the monitoring device 120 may generate a first state parameter SP_1 by monitoring a state of the conveying device 110 in the position of the first node N1. Next, when the conveying device 110 visits the second node N2, the monitoring device 120 may generate a second state parameter SP_2 by monitoring a state of the conveying device 110 in the position of the second node N1. As an exemplary embodiment, the first node-based position information NPI_1 and the first state parameter SP_1 may be provided to the diagnostic device 130 at the same time, and the second node-based position information NPI_2 and the second state parameter SP_2 may be provided to the diagnostic device 130 at the same time.

Referring to FIG. 8B, the second conveyance path TR2 may include a plurality of nodes N1-N10. The number of nodes included in the second conveyance path TR2 of FIG. 8B may be less than that the number of nodes included in the first conveyance path TR1 of FIG. 8A. The second conveyance path TR2 may include a plurality of links L1-L6 (i.e., first through sixth links L1-L6). The first link L1 may correspond to a path in which the first node N1 is a start node and the second node N2 is an end node. The second link L2 may correspond to a path in which the second node N2 is a start node and the third node N3 is an end node. The third link L3 may correspond to a path in which the third node N3 is a start node and the fourth node N4 is an end node. The fourth link L4 may correspond to a path in which the fourth node N4 is a start node and the fifth N5 is an end node. The fifth link L5 may correspond to a path in which the fifth node N5 is a start node and the sixth node N6 is an end node. The sixth link L6 may correspond to a path in which the sixth node N6 is a start node and the first node N1 is an end node. However, this is only an example, and links having various paths may be formed by setting one of the nodes N1-N10 as a start node and another one of the nodes N1-N10 as an end node.

As described above, the diagnostic device 130 may determine a node which the conveying device 110 is positioned at, with reference to the node-based position information NPI. Also, the diagnostic device 130 may receive the node-based position information NPI and the driving information DI from the conveying device 110, and may determine the position of the conveying device 110, which corresponds to each of a plurality of points P1-P9, based on the node-based position information NPI and the driving information DI. However, the inventive concept is not limited to the first conveyance path TR1 shown in FIG. 8A or the second conveyance path TR2 shown in FIG. 8B, and the first and second conveyance paths TR1 and TR2 may be variously implemented.

FIG. 9A is a diagram showing node information 1 included in map data, and FIG. 9B is a diagram showing link information 2 included in the map data.

Referring to FIGS. 8B and 9A, the node information 1 may include at least one from among a node identification (ID), horizontal and vertical position coordinates corresponding to the node ID, and a node attribute corresponding to the node ID. As an exemplary embodiments, the horizontal and vertical position coordinates corresponding to the node ID may correspond to a category indicating a position in a coordinate form, based on any one of the plurality of nodes N1-N10 included in the second conveyance path TR2 of FIG. 8B. The node attribute may correspond to a category indicating whether a conveyance path diverges from or connects to each of the nodes N1-N10 when a conveying device moves along the conveyance path.

When it is assumed that a conveying device moves from the first node N1, which is a start node, toward the sixth node N6, horizontal and vertical position coordinates of the first node N1 may be '(0, 0)' based on the first node N1, and a node attribute of the first node N1 may correspond to 'joining' because two paths in the conveyance path are connected to the first node N1. Horizontal and vertical position coordinates of the second node N2 may be '(−20, 0)', and a node attribute of the second node N2 may correspond to 'normal' because neither two paths in the conveyance path are connected to the second node N2 nor two paths diverge from the second node N2. Horizontal and vertical position coordinates of the third node N3 may be '(−20,10)', and a node attribute of the third node N3 may correspond to 'normal' because neither two paths in the conveyance path are connected to the third node N3 nor two paths diverge from the third node N3. Horizontal and vertical position coordinates of the sixth node N6 may be '(20, 0)', and a node attribute of the sixth node N6 may correspond to 'divergence' because two paths in the conveyance path diverge from the sixth node N6. In this manner, the map data may include the node information 1 for the plurality of nodes N1-N10 included in the second conveyance path TR2.

Referring to FIGS. 8B and 9B, the link information 2 may include at least one from among a link ID, a start node ID (i.e., an ID of a start node) and an end node ID (i.e., an ID of an end node) corresponding to the link ID, and a link attribute and a curve angle corresponding to the link ID. The link attribute may correspond to a category indicating whether a link is a straight line or a curve. The curve angle is an angle of a curvature of the link. When it is assumed that a conveying device moves from the first node N1, which is a start node, toward the sixth node N6, a start node ID of a first link L1 may be the 'first node N1', an end node ID of the first link L1 may be the 'second node N2', a link attribute of the first link L1 may correspond to a 'straight line', and a curve angle of the first link L1 may correspond to '0° '. A start node ID of a second link L2 may be the 'second node N2', an end node ID of the second link L2 may be the 'third node N3', a link attribute of the second link L2 may correspond to a 'curve', and a curve angle of the second link L2 may correspond to 'x'". As an exemplary embodiment, the 'x° ' may be between 0° and 180°. A start node ID of a third link L3 may be the 'third node N3', an end node ID of the third link L3 may be the 'fourth node N4', a link attribute of the third link L3 may correspond to a 'straight line', and a curve angle of the third link L3 may correspond to '0° '. In this manner, the map data may include the link information 2 for the plurality of links L1-L6 included in the second conveyance path TR2.

Figure 10:
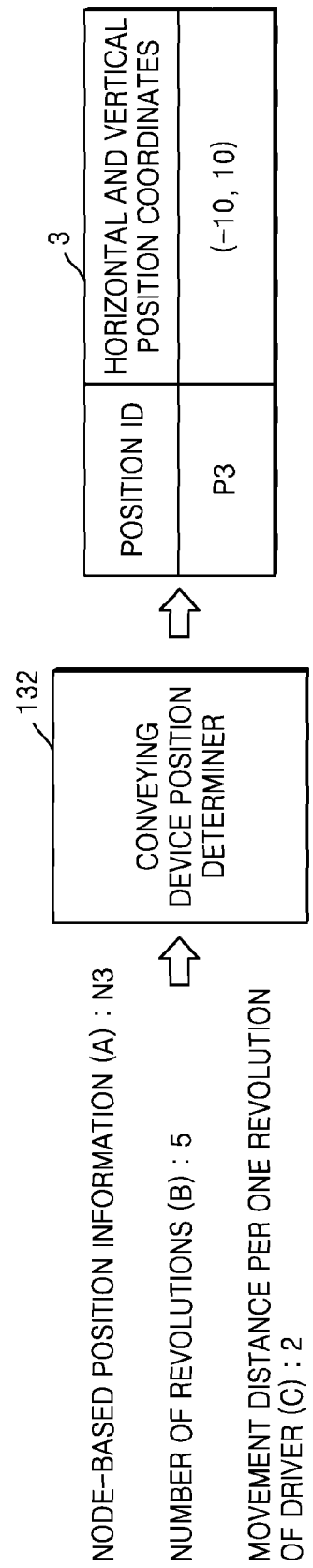
FIG. 10 is a diagram for explaining a method of determining a position of a conveying device, according to an exemplary embodiment.

FIG. 10 is a diagram for explaining a method of determining the position of a conveying device, according to an exemplary embodiment.

Referring to FIGS. 1, 8B, 9A, 9B, and 10, the conveying device position determiner 132 of the diagnostic device 130 may identify a node visited by the conveying device 110 as the third node N3 with reference to node-based position information (A) previously received from the conveying device 110, to determine the position of the conveying device 110. The conveying device position determiner 132 may calculate a movement distance of the conveying device 110, based on driving information including the number of revolutions (B) of a driver and a movement distance (C) per one revolution of the driver, and determine a third point P3 as the position of the conveying device 110. For example, it may be understood that the position of the third node N3 is '(−20, 10)', with reference to the node information 1 of the map data of FIG. 9A, and it may be understood that the third link L3 in which the third node N3 is a start node corresponds to a straight line, with reference to the link information 2 of the map data of FIG. 9B. Thus, since the number of revolutions (B) of a driver is '5' and the movement distance (C) per one revolution of the driver is '2', the conveying device 110 may move up to a distance of '10' in the positive x-axis direction. Thus, the position of the third point P3 is determined as '(−10, 10).

In this manner, the conveying device position determiner 132 may accurately determine the position of the conveying device 110 by determining, in addition to the node positions, positions P1-P9 other than node positions in a conveyance path. Thus, a monitoring operation may be more effectively performed.

Figure 11:
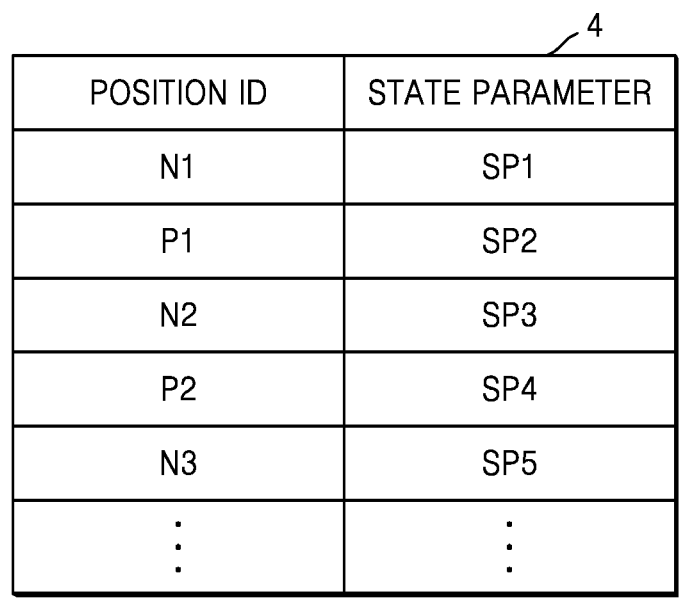
FIG. 11 is a diagram showing a state parameter matched with a position of a conveying device determined by a conveying device position determiner of FIG. 4A, according to an exemplary embodiment.

FIG. 11 is a diagram showing a state parameter matched with the position of a conveying device determined by the conveying device position determiner 132 of FIG. 4A, according to an exemplary embodiment.

Referring to FIGS. 1, 4A, 8B, and 11, the conveying device controller 136 may match a position of the conveying device 110, determined by the conveying device position determiner 132, to a state parameter generated at the determined position of the conveying device 110 from among received state parameters SP. In other words, a position ID of a conveyance path may be matched to a state parameter according to the position ID. When the conveying device 110 is determined as being located at a first node N1 by the conveying device position determiner 132, the diagnostic device controller 136 may match a first state parameter SP1 generated at the first node N1 to the first node N1. In addition, when the conveying device 110 is determined as being located at a first point P1 by the conveying device position determiner 132, the diagnostic device controller 136 may match a second state parameter SP2 generated at the first point P1 to the first point P1.

Through a configuration as described above, it is possible to accurately recognize a driving state of the conveying device 110 and a state of a surrounding environment in points P1-P9 corresponding to positions other than nodes of the second conveyance path TR2.

Figure 12:
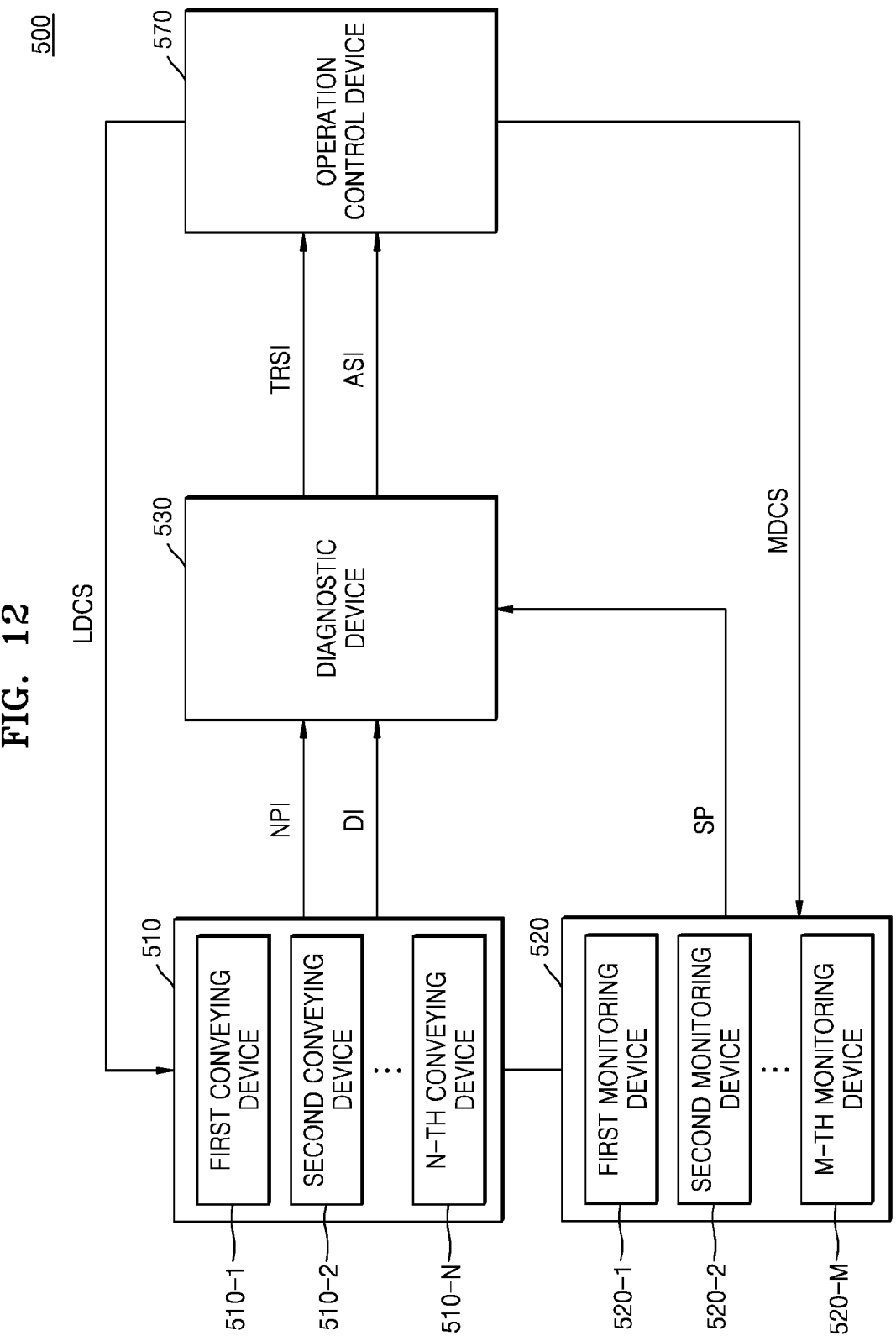
FIG. 12 is a block diagram of a logistics monitoring system according to another exemplary embodiment.

FIG. 12 is a block diagram of a logistics monitoring system 500 according to another exemplary embodiment.

Referring to FIG. 12, the logistics monitoring system 500 may include a plurality of conveying devices 510, a plurality of monitoring devices 520, a diagnostic device 530, and an operation control device 570. Each of the plurality of conveying devices 510 may generate node-based position information NPI and driving information DI and provide the node-based position information NPI and the driving information DI to the diagnostic device 530. The plurality of monitoring devices 520 may be attached to the plurality of conveying devices 510, respectively, and may generate a state parameter SP by monitoring a driving state of each of the conveying devices 510 or a state of a surrounding environment. As an exemplary embodiment, a first monitoring device 520-1 may be attached to a first conveying device 510-1, and thus, the first monitoring device 520-1 may generate a state parameter SP for the first conveying device 510-1. The second monitoring device 520-2 may be attached to the second conveying device 510-2, and thus, the second monitoring device 520-2 may generate a state parameter SP for the second conveying device 510-2.

The diagnostic device 530 corresponds to the diagnostic device 130 of FIG. 1, and may perform operation that are the same as or similar to operations described above with respect to the diagnostic device 130. The diagnostic device 530 may generate test route setting information TRSI, which is used for performing a test operation, based on at least one from among the node-based position information NPI and the driving information DI, received from the plurality of conveying devices 510. The test operation may be an operation of moving a conveying device along a test route independent of a conveyance operation and performing a monitoring operation via a monitoring device 520 attached to the conveying device 510.

Also, the diagnostic device 530 may compare a state parameter SP received from the plurality of monitoring devices 520 to a previously set reference value (i.e., threshold value) corresponding to the state parameter SP. In this case, when the state parameter SP exceeds the reference value or is less than the reference value, the diagnostic device 530 may determine a position of the conveying device 110, at which the state parameter SP has been generated, as an abnormal state position and generate abnormal state information ASI indicating the abnormal state position.

The operation control device 570 may control a moving operation of the plurality of conveying devices 510 along a conveyance path and a conveyance operation of conveying products, by generating a conveying device control signal LDCS and providing the conveying device control signal LDCS to plurality of conveying devices 510. Also, the operation control device 570 may control a test operation by generating a monitoring device control signal MDCS and providing the monitoring device control signal MDCS to the plurality of monitoring devices 520. The operation control device 570 may set a test route based on the test route setting information TRSI received from the diagnostic device 530. To perform a test operation, the plurality of conveying devices 510 may be moved along a test route.

For example, the operation control device 570 may control an operation of conveying products with respect to the first conveying device 510-1, and may control a monitoring operation with respect to the first monitoring device 520-1 attached to the first conveying device 520-1 at the same time. Also, to perform a test operation, the operation control device 570 may control a moving operation along a test route with respect to the second conveying device 510-2 whose conveyance operation has been completed, and may control a monitoring operation with respect to the second monitoring device 520-2 attached to the second conveying device 520-1 at the same time. In this manner, the operation control device 570 may separately control operations of the plurality of the conveying devices 510 and operations of the plurality of monitoring devices 520 according to circumstances.

The operation control device 570 may receive the abnormal state information ASI from the diagnostic device 530, and may control the plurality of conveying devices 510 and the plurality of monitoring devices 520 based on the received abnormal state information ASI. For example, the operation control device 570 may determine an abnormal state position through the abnormal state information ASI and stop a conveying device, which is expected to visit the abnormal state position, or move the conveying device to another conveyance path. In addition, the operation control device 570 may set a test route based on the abnormal state information ASI.

Through this operation, the logistics monitoring system 500 may determine a position to perform a test operation, and set a test route based on the position. By controlling a monitoring operation while moving a conveying device, which does not perform a conveyance operation, along a test route, an effective monitoring operation may be performed.

Figure 13:
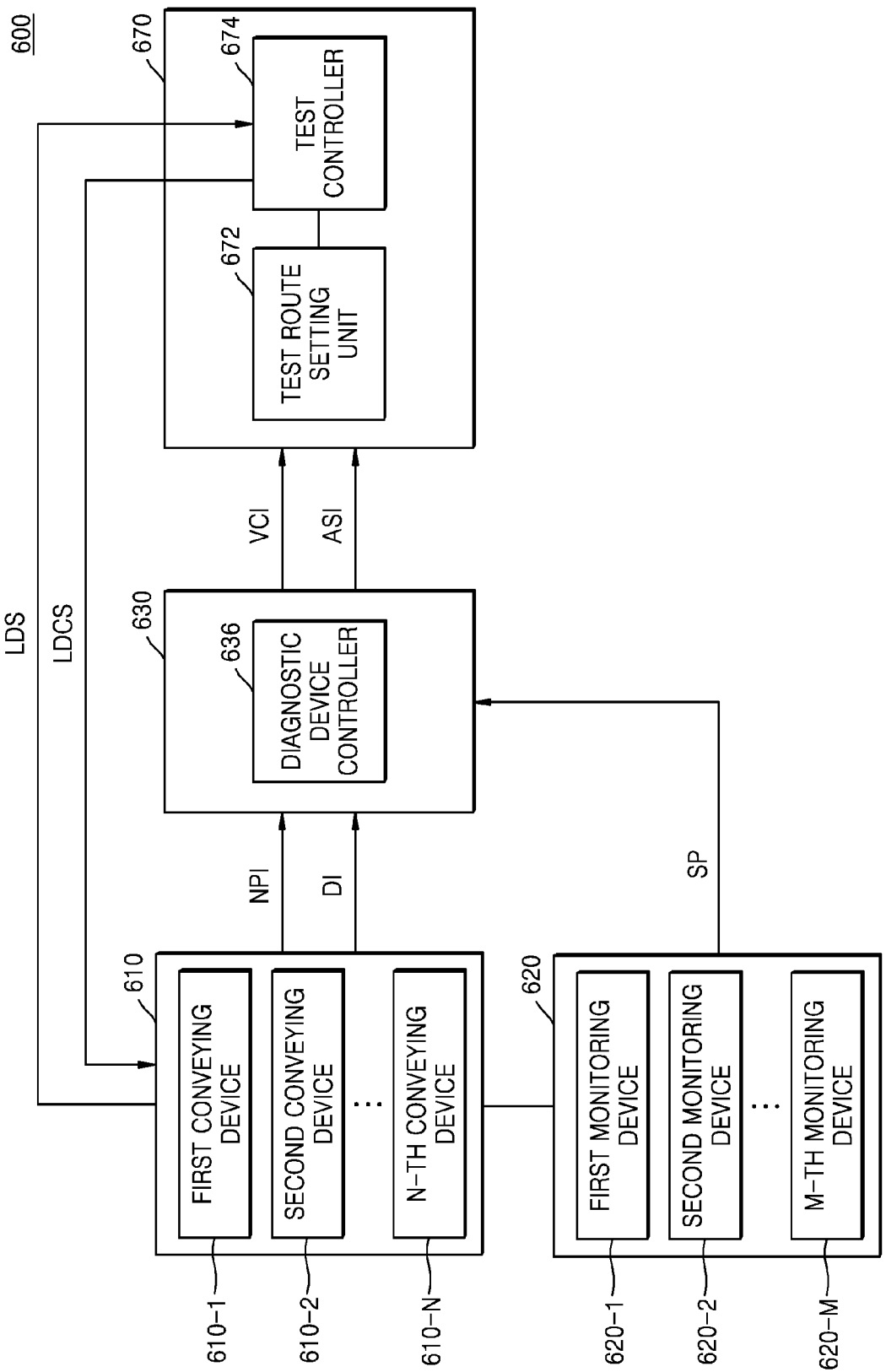
FIG. 13 is a block diagram of a logistics monitoring system according to another exemplary embodiment.
Figure 14B:
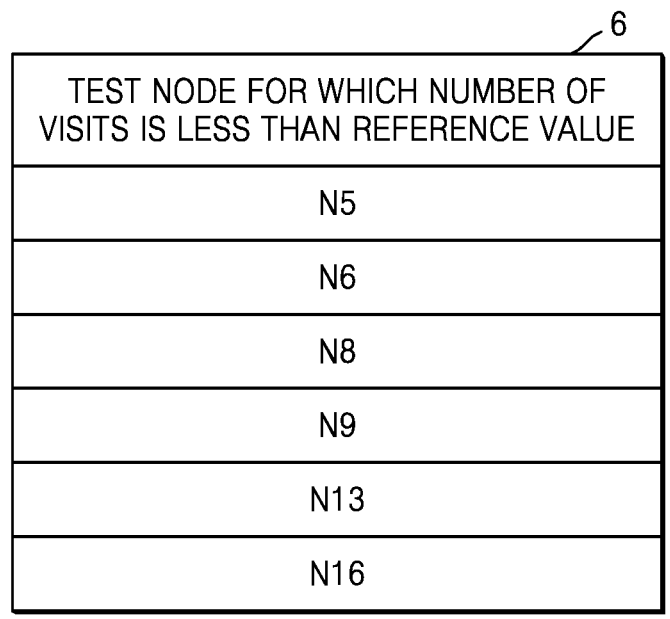
Figure 15A:
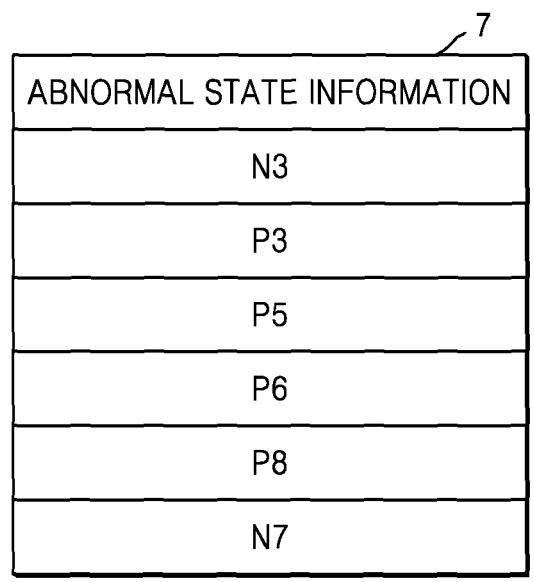

FIG. 13 is a block diagram of a logistics monitoring system 600 according to another exemplary embodiment. FIGS. 14A, 14B, and 14C are diagrams for explaining a method of setting a test route, according to an exemplary embodiment. FIGS. 15A and 15B are diagrams for explaining a method of setting a test route, according to another exemplary embodiment.

Referring to FIG. 13, the logistics monitoring system 600 may include a plurality of conveying devices 610, a plurality of monitoring devices 620, a diagnostic device 630, and an operation control device 670. The plurality of conveying devices 610 may correspond to the plurality of conveying devices 510 of FIG. 12, and the plurality of monitoring devices 620 may correspond to the plurality of monitoring devices 520 of FIG. 12.

The diagnostic device 630 may include a diagnostic device controller 636. The diagnostic device controller 636 may generate information VCI indicating the number of times each of the plurality of nodes N1-N19 (i.e., first through nineteenth nodes N1-N19) of the first conveyance path TR1 of FIG. 8A is visited by the conveying devices 610, with reference to node-based position information. Referring to FIG. 14A, information 5 about the number of visits is information indicating the number of visits to each of the plurality of nodes N1-N19 by the plurality of conveying devices 610. The plurality of conveying devices 610 have visited the first node N1 'six times', and have visited the second node N2 'seven times'. In this manner, the number of visits to each of the nodes N1-N19 may be listed.

Referring to FIGS. 8A, 13, and 14B, the operation control device 670 may include a test route setting unit 672 and a test controller 674. The test route setting unit 672 may receive the information VCI indicating the number of times each of the plurality of nodes N1-N19 has been visited by the conveying devices 610, and may identify a test node for which the number of visits is less than a reference value, from among the plurality of nodes N1-N19, based on the received information VCI. The test route setting unit 672 may set a test route based on the detected test node. The reference value of the number of visits may be set in advance and stored in the test route setting unit 672. For example, when the reference value of the number of visits is 'five times', the test route setting unit 672 may identify nodes which have been visited less than 'five times', as test nodes. In FIG. 14B, the fifth node N5, the sixth node N6, the eighth node N8, the ninth node N9, the thirteenth node N13, and the sixteenth node N16 may be detected as test nodes.

Referring to FIGS. 13 and 14C, the test route setting unit 672 may set a test route based on detected test nodes, as shown in FIG. 14B. As an exemplary embodiment, the test route setting unit 672 may set a first test route A so that nodes are visited in the following order: the fifth node N5→ the sixth node N6→ the eighth node N8→ the ninth node N9→ the thirteenth node N13→ the sixteenth node N16. As another exemplary embodiment, the test route setting unit 672 may set a second test route B including a test route in order of the fifth node N5→ the sixth node N6→ the eighth node N8 and a test route in order of the ninth node N9→ the thirteenth node N13→ the sixteenth node N16. As another exemplary embodiment, the test route setting unit 672 may set a third test route including a test route in order of the fifth node N5→ the sixth node N6, a test route in order of the eighth node N8→ the ninth node N9, and a test route in order of the thirteenth node N13→ the sixteenth node N16. However, this case is only an example, and the inventive concept is not limited thereto and various test routes may be set.

Referring to FIGS. 8B, 13, and 15A, the test route setting unit 672 may set a test route based on abnormal state information 7 as shown in FIG. 15A. In other words, a test operation may be performed with respect to the third node N3, the third point P3, the fifth point P5, the sixth point P6, the eighth point P8, and the seventh node N7, which correspond to abnormal state positions in which a state parameter exceeds a reference value or is less than the reference value.

Referring to FIGS. 13 and 15B, the test route setting unit 672 may set a test route based on abnormal state positions, as shown in FIG. 15B. As an exemplary embodiment, the test route setting unit 672 may set a first test route A in order of the third node N3→ the third point P3→ the fifth point P5→ the sixth point P6→ the eighth point P8→ the seventh node N7. As another exemplary embodiment, the test route setting unit 672 may set a second test route B including a test route in order of the third node N3→ the third point P3→ the fifth point P5 and a test route in order of the sixth point P6→ the eighth point P8→ the seventh node N7. As another exemplary embodiment, the test route setting unit 672 may set a third test route C including a test route in order of the third node N3→ the third point P3, a test route in order of the fifth point P5→ the sixth point P6, and a test route in order of the eighth point P8→ the seventh node N7. However, this case is only an example, and the inventive concept is not limited thereto and various test routes may be set.

The test controller 674 may generate a conveying device control signal LDCS and control a test operation by using the control device control signal LDCS, and may control an operation in which the plurality of conveying devices 610 move along a test route set by the test route setting unit 672. The test controller 674 may select a conveying device, on which a monitoring operation is to be performed, from among the plurality of conveying devices 610 and perform a test operation on the selected conveying device. As an exemplary embodiment, the test controller 674 may receive a conveying device signal LDS, which indicates whether the plurality of conveying devices 610 performs an operation of conveying products, from the plurality of conveying devices 610. Also, the test controller 674 may select conveying devices, which do not perform a conveyance operation, based on the received conveying device signal LDS and perform a test operation on the selected conveying devices. In addition, the test controller 674 may select a conveying device, which is closest to a start node or start position of a test route, from among the conveying devices that do not perform a conveyance operation, and may perform a test operation on the selected conveying device.

The test controller 674 may change the number of conveying devices 610 that are selected for a test operation, based on the number of test routes. For example, referring to FIG. 14C, when a test route includes a single test route, such as the first test route A, only one conveying device may be selected to perform a test operation thereon. When a test route includes two test routes, such as the second test route B, two conveying devices may be selected to perform a test operation thereon.

Also, when a test operation is performed, the test controller 674 may determine whether to perform a test operation based on a ratio of the number of conveying devices 610 to a conveyance workload of the conveying devices 610 and select at least one of the plurality of conveying devices 610 when it is determined that a test operation is to be performed. As an exemplary embodiment, the conveyance workload may include information indicating the number of products to be transported, that is, conveyance target objects of the conveying devices 610. The test controller 674 may receive information indicating the number of products to be transported, which is updated in real time. The test controller 674 may perform a test operation when a ratio of the number of conveying devices 610 to the number of products to be transported is equal to or less than a reference value. For example, when the number of conveying devices 610 is 100 and the number of products to be transported, updated in real time, is 80, the ratio is 80/100, i.e., 80%. Thus, when a reference value previously set in the test controller 674 for the ratio of the number of conveying devices 610 to the conveyance workload of the conveying devices 610 is 50%, the test controller 674 may determine not to perform a test operation. However, when the number of products to be transported, updated in real time, is 40, the ratio is 40/100, i.e., 40% that is less than the previously set reference value 50%, and thus, the test controller 674 may determine to perform a test operation and may select at least one of the plurality of conveying devices 610 to perform the test operation thereon.

Figure 16:
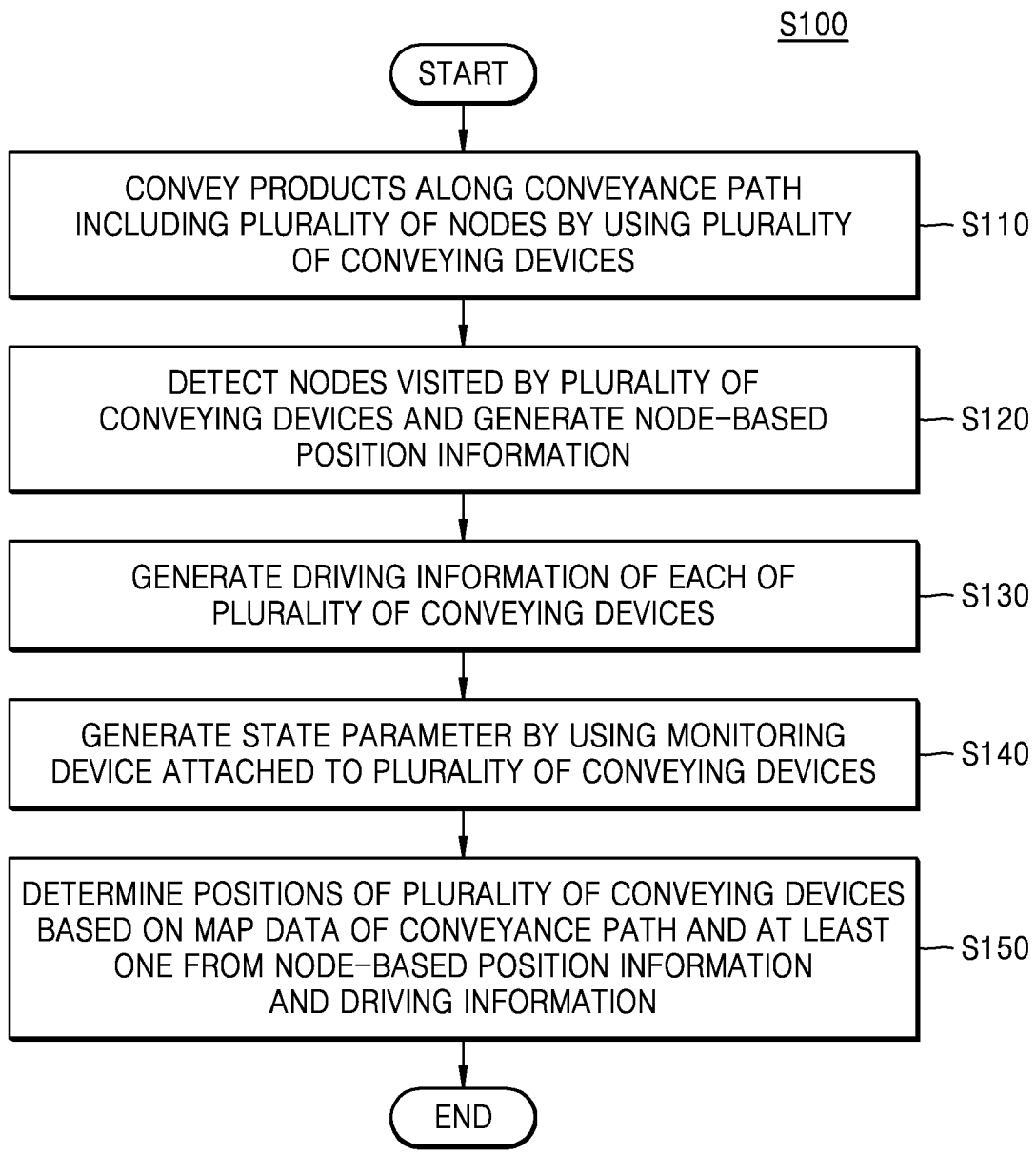
FIGS. 16 and 17 are flowcharts illustrating methods of operating a logistics monitoring system, according to exemplary embodiments.
Figure 17:
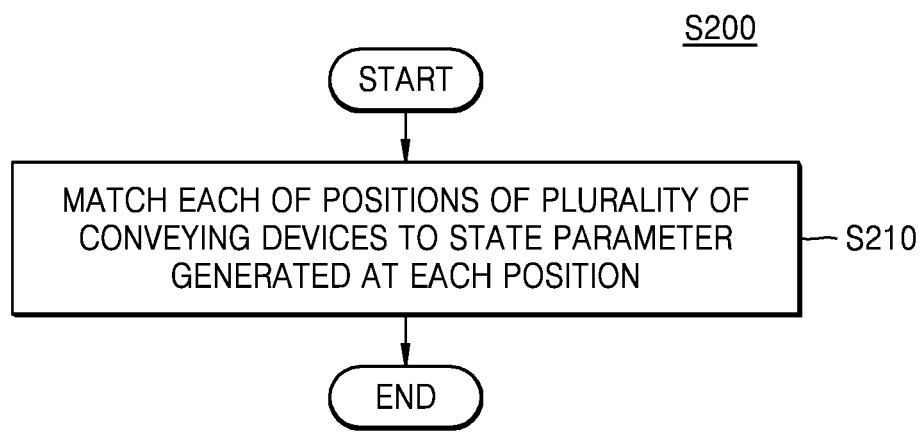

FIGS. 16 and 17 are flowcharts illustrating methods S100 and S200 of operating a logistics monitoring system, according to exemplary embodiments.

Referring to FIG. 16, a plurality of conveying devices convey products along a conveyance path including a plurality of nodes (operation S110). Nodes visited by the plurality of conveying devices are detected and node-based position information is generated (operation S120). Driving information of each of the plurality of conveying devices is generated (operation S130). A state parameter is generated by using a monitoring device attached to the plurality of conveying devices (operation S140). Positions of the plurality of conveying devices are determined based on map data of the conveyance path and at least one from among the node-based position information and the driving information (operation S150).

Referring to FIG. 17, each of the positions of the plurality of conveying devices, determined via the method of FIG. 16, is matched to a state parameter generated at the position (operation S210).

Figure 18:
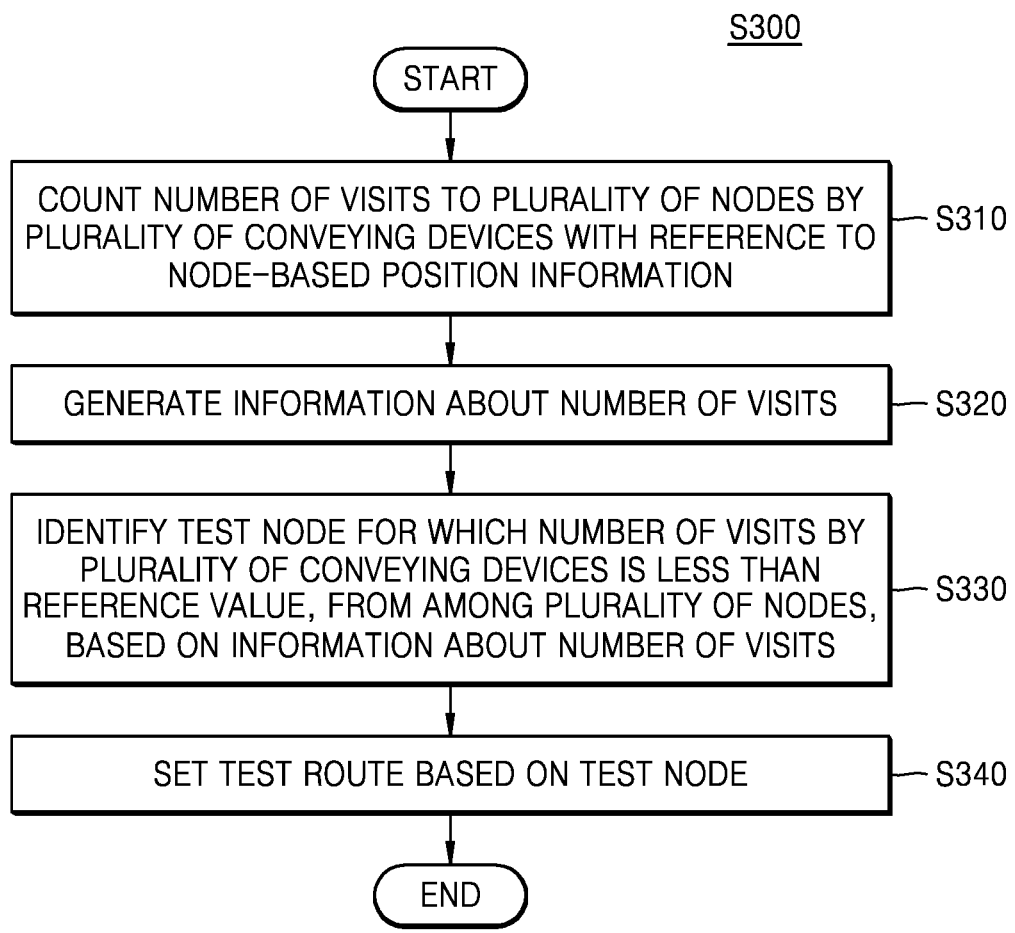
FIG. 18 is a flowchart illustrating a method of setting a test route when performing a test operation, according to an exemplary embodiment.

FIG. 18 is a flowchart illustrating a method S300 of setting a test route when performing a test operation, according to an exemplary embodiment.

The number of visits of a plurality of conveying devices with respect to a plurality of nodes is counted with reference to node-based position information (operation S310). Information about the number of visits is generated based on the counted number of visits (operation S320). Based on the information about the number of visits, a test node, of which the number of visits of the plurality of conveying devices is less than a reference value, is detected from among the plurality of nodes (operation S330). A test route is set based on the detected test node (operation S340).

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. A logistics monitoring system comprising:
    a conveying device configured to transport a product along a conveyance path comprising a plurality of nodes, generate node-based position information based on a node visited by the conveying device from among the plurality of nodes, and generate driving information related to driving of the conveying device;
    a monitoring device configured to monitor a state of the conveying device and generate a state parameter based on a result of the monitoring;
    a diagnostic device configured to determine a position of the conveying device based on map data and at least one of the node-based position information and the driving information, the map data comprising node information about each of the plurality of nodes and link information about each of a plurality of links, the plurality of links respectively connecting at least two of the plurality of nodes; and
    a conveyance control device configured to control movement of a plurality of conveying devices,
    wherein the conveyance control device identifies a test node for which a number of visits by the plurality of conveying devices is less than a reference value, from among the plurality of nodes, determines a test route based on the test node, and performs a test operation by moving at least one of the plurality of conveying devices along the test route.

2. The logistics monitoring system of claim 1, wherein the diagnostic device determines the position of the conveying device based on the map data and the driving information, and
    wherein the diagnostic device identifies the node visited by the conveying device, determines a position of the visited node based on the map data, and determines the position of the conveying device by calculating a distance by which the conveying device has moved from the position of the visited node based on the driving information.

3. The logistics monitoring system of claim 2, wherein the conveying device comprises a driving device that moves the conveying device along the conveyance path, and
    wherein the driving information comprises a number of rotations of the driving device in a predetermined period of time.

4. The logistics monitoring system of claim 1, wherein the diagnostic device comprises a diagnostic device controller that matches the determined position of the conveying device to a state parameter that is generated by the monitoring device based on the state of the conveying device at the determined position.

5. The logistics monitoring system of claim 4, wherein the diagnostic device comprises a display device that displays the determined position of the conveying device and the state parameter matched to the determined position of the conveying device.

6. The logistics monitoring system of claim 1, wherein the diagnostic device comprises a map data storage unit configured to store the map data of the conveyance path.

7. The logistics monitoring system of claim 1, wherein the node information comprises at least one from among a node identification (ID) of a node, horizontal position coordinates corresponding to the node, vertical position coordinates corresponding to the node, and an attribute corresponding to the node, and the link information comprises at least one from among a link ID of a link, a start node ID indicating a node at which the link starts, an end node ID indicating a node at which the link ends, and an attribute corresponding to the link.

8. The logistics monitoring system of claim 1, wherein the monitoring device comprises a sensor that generates the state parameter, the state parameter comprising at least one of a driving parameter indicating a driving state of the conveying device and an environmental parameter indicating a state of a surrounding environment of the conveying device.

9. The logistics monitoring system of claim 8, wherein the driving parameter comprises a parameter of at least one from a velocity, an acceleration, an equilibrium, an angular velocity, and a vibration of the conveying device, and the environmental parameter comprises a parameter relating to at least one from among a temperature, a humidity, an atmospheric pressure, a geomagnetic, a radioactivity, a noise, a fine dust, and a gas of the surrounding environment of the conveying device.

10. The logistics monitoring system of claim 1, wherein the diagnostic device generates information about the number of visits to the plurality of nodes by the plurality of conveying devices based on the node-based position information, and wherein the conveyance control device identifies the test node based on the information about the number of visits.

11. The logistics monitoring system of claim 10, wherein the conveyance control device determines whether to perform the test operation, based on a ratio of the number of the plurality of conveying devices to a conveyance workload of the plurality of conveying devices.

12. A method of operating a logistics monitoring system, the method comprising:
transporting a product along a conveyance path comprising a plurality of nodes by using a plurality of conveying devices;
identifying nodes visited by the plurality of conveying devices and generating node-based position information of the plurality of conveying devices based on a result of the identifying;
generating driving information related to driving of the plurality of conveying devices;
generating a state parameter, which indicates a state of each of the plurality of conveying devices, by using monitoring devices respectively attached to the plurality of conveying devices;
determining positions of the plurality of conveying devices based on map data of the conveyance path and at least one from among the node-based position information and the driving information, the map data comprising node information of each of the plurality of nodes and link information of each of a plurality of links, the plurality of links respectively connecting at least two of the plurality of nodes;
identifying a test node for which a number of visits by the plurality of conveying devices is less than a reference value, from among the plurality of nodes; and
determining a test route based on the test node, and performing a test operation by moving at least one of the plurality of conveying devices along the test route.

13. The method of claim 12, further comprising matching a position of each of the plurality of conveying devices to a state parameter that is generated based on the state of each of the plurality of conveying devices at the position.

14. The method of claim 12, wherein the identifying the test node comprises:
generating information about the number of visits to the plurality of nodes by the plurality of conveying devices based on the node-based position information; and
identifying the test node based on the information about the number of visits.

15. A logistics monitoring system comprising:
a conveying device configured to move along a conveyance path comprising a plurality of nodes and transmit node-based position information based on a node visited by the conveying device;
a monitoring device configured to monitor a state of the conveying device and generate a state parameter based on a result of monitoring; and
a diagnostic device configured to determine a position of the conveying device based on map data and the node-based position information, the map data comprising node information about each of the plurality of nodes and link information about each of a plurality of links, the plurality of links respectively connecting at least two of the plurality of nodes,
wherein the diagnostic device controls the conveying device based on at least one of the position of the conveying device and the state parameter,
wherein the diagnostic device comprises a diagnostic device controller that matches the determined position of the conveying device to a state parameter that is generated by the monitoring device based on the state of the conveying device at the determined position, and
wherein the diagnostic device controller determines a certain position of the conveying device having an abnormal state in response to determining that the state parameter that matches the certain position of the conveying device is not within a reference range, and the conveyance path is adjusted based on the certain position of the conveying device having the abnormal state.

16. The logistics monitoring system of claim 15, wherein the conveying device generates driving information related to driving of the conveying device, and
wherein the diagnostic device determines the position of the conveying device further based on the driving information, by calculating a distance by which the conveying device has moved from a position of the visited node based on the driving information.

17. The logistics monitoring system of claim 15, wherein the conveyance control device determines a test route based on the node-based position information, and performs a test operation by moving the conveying device along the test route.

* * * * *